United States Patent
Liu et al.

(10) Patent No.: US 10,698,658 B2
(45) Date of Patent: Jun. 30, 2020

(54) RANDOM NUMBER GENERATION FROM SPIN TORQUE OSCILLATOR NOISE

(71) Applicant: Seagate Technology LLC, Cupertino, CA (US)

(72) Inventors: Xiong Liu, Singapore (SG); Lihong Zhang, Singapore (SG); WenXiang Xie, Singapore (SG); Quan Li, Singapore (SG)

(73) Assignee: Seagate Technology LLC, Fremont, CA (US)

(*) Notice: Subject to any disclaimer, the term of this patent is extended or adjusted under 35 U.S.C. 154(b) by 19 days.

(21) Appl. No.: 15/894,116

(22) Filed: Feb. 12, 2018

(65) Prior Publication Data

US 2019/0250887 A1    Aug. 15, 2019

(51) Int. Cl.
*G06F 7/58* (2006.01)

(52) U.S. Cl.
CPC .............. *G06F 7/582* (2013.01); *G06F 7/588* (2013.01)

(58) Field of Classification Search
CPC ....................................................... G06F 7/588
USPC ...................................................... 708/251
See application file for complete search history.

(56) References Cited

U.S. PATENT DOCUMENTS

| | | | |
|---|---|---|---|
| 6,195,669 B1 * | 2/2001 | Onodera | G06F 7/588 708/250 |
| 7,167,882 B2 | 1/2007 | Xie et al. | |
| 7,483,227 B1 | 1/2009 | Chen et al. | |
| 8,917,465 B1 | 12/2014 | Contreras et al. | |
| 2007/0162809 A1 * | 7/2007 | de Jager | G06F 7/58 714/746 |
| 2013/0073598 A1 * | 3/2013 | Jacobson | G06F 7/588 708/252 |
| 2014/0119164 A1 | 5/2014 | Wilson et al. | |

OTHER PUBLICATIONS

W.H. Choi, et al., A Magnetic Tunnel Junction Based True Random Number Generator with Conditional Perturb and Real-time Output Probability Tracking, Proceedings International Electron Devices Meeting (IEDM), pp. 12.5.1-12.5.4, 2014 (Year: 2014).*

X. Fong, et al., Spin-Transfer Torque Devices for Logic and Memory; Prospects and Perspectives, IEEE Transactions on Computer-Aided Design of Integrated Circuits and Systems, vol. 35, No. 1, 2016 (Year: 2016).*

Satoshi Okamoto, Nobuaki Kikuchi, Masaki Furuta, Osamu Kitakami and Takehito Shimatsu, Microwave Assisted Magnetic Recording Technologies and Related Physics, Journal of Physics D: Applied Physics, vol. 48 (2015), No. 35, Sep. 9, 2015 [353001] (18pp).

* cited by examiner

*Primary Examiner* — Andrew Caldwell
*Assistant Examiner* — Emily E Larocque
(74) *Attorney, Agent, or Firm* — Hall Estill Attorneys at Law (57) ABSTRACT

Apparatuses and methods disclosed herein relate to detecting a signal generated by a spin torque oscillator (STO). The signal is outputted, wherein the signal includes a direct current (DC) component, a wide bandwidth noise component, and an STO oscillating radio frequency (RF) component. The signal is filtered, wherein the filtering removes the DC component and the STO oscillating RF component, leaving the wide bandwidth noise component. A value of the wide bandwidth noise component is converted into a binary value, and a bit from the binary value is selected and combined with another bit to form a random number.

20 Claims, 6 Drawing Sheets

```
┌─────────────────────────────────────────┐
│   DETECTING A SIGNAL GENERATED BY       │
│   A SPIN TORQUE OSCILLATOR (STO)        │
│                 402                     │
└─────────────────────────────────────────┘
                    │
┌─────────────────────────────────────────┐
│ OUTPUTTING THE SIGNAL, WHEREIN THE SIGNAL INCLUDES A DIRECT │
│ CURRENT (DC) COMPONENT, A WIDE BANDWIDTH NOISE COMPONENT,   │
│ AND AN STO OSCILLATING RADIO FREQUENCY (RF) COMPONENT       │
│                 404                     │
└─────────────────────────────────────────┘
                    │
┌─────────────────────────────────────────┐
│ FILTERING THE SIGNAL, WHEREIN THE FILTERING REMOVES THE DC  │
│ COMPONENT AND THE STO OSCILLATING RF COMPONENT, LEAVING     │
│ THE WIDE BANDWIDTH NOISE COMPONENT       │
│                 406                     │
└─────────────────────────────────────────┘
                    │
┌─────────────────────────────────────────┐
│ CONVERTING A VALUE OF THE WIDE BANDWIDTH NOISE COMPONENT │
│              TO A BINARY VALUE           │
│                 408                     │
└─────────────────────────────────────────┘
                    │
┌─────────────────────────────────────────┐
│      SELECTING A BIT FROM THE BINARY VALUE │
│                 410                     │
└─────────────────────────────────────────┘
                    │
┌─────────────────────────────────────────┐
│  COMBINING THE BIT WITH ANOTHER BIT TO FORM A NUMBER │
│                 412                     │
└─────────────────────────────────────────┘
```

```
┌─────────────────────────────────────────────────────────────┐
│ DETECTING A SIGNAL GENERATED BY A SPIN TORQUE OSCILLATOR,   │
│ AND POSITIONING THE SPIN TORQUE OSCILLATOR ON A LOAD/UNLOAD │
│                            RAMP                             │
│                            502                              │
└─────────────────────────────────────────────────────────────┘
                              │
┌─────────────────────────────────────────────────────────────┐
│              SAMPLING A VALUE OF THE SIGNAL                 │
│                            504                              │
└─────────────────────────────────────────────────────────────┘
                              │
┌─────────────────────────────────────────────────────────────┐
│   CONVERTING THE VALUE OF THE SIGNAL INTO A NUMERICAL VALUE │
│                            506                              │
└─────────────────────────────────────────────────────────────┘
                              │
┌─────────────────────────────────────────────────────────────┐
│  COMBINING A DIGIT FROM THE NUMERICAL VALUE WITH ANOTHER    │
│    DIGIT FROM ANOTHER NUMERICAL VALUE TO FORM A NUMBER,     │
│ WHEREIN THE DIGIT FROM THE NUMERICAL VALUE IS SELECTED FROM │
│    A DIFFERENT DIGIT ORDER THAN THE ANOTHER DIGIT FROM THE  │
│                    ANOTHER NUMERICAL VALUE                  │
│                            508                              │
└─────────────────────────────────────────────────────────────┘
```

FIG. 5

RANDOM NUMBER GENERATION FROM SPIN TORQUE OSCILLATOR NOISE

SUMMARY

Provided herein is a method including detecting a wide bandwidth noise signal generated by a spin torque oscillator (STO) and outputting a signal corresponding to the detecting. The signal includes a direct current (DC) signal component, a wide bandwidth noise signal component, and an STO oscillating radio frequency (RF) signal component. The DC component and the STO oscillating RF component are filtered out, leaving only the wide bandwidth noise component from the STO. An analog-to-digital converter (ADC) sampled value of processed wide bandwidth noise component is converted to a binary value and a bit is selected from the binary value. The selected bit is combined with another bit to form a number. These and other features and advantages will be apparent from a reading of the following detailed description.

DESCRIPTION

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "middle," "bottom," "beside," "forward," "reverse," "overlying," "underlying," "up," "down," or other similar terms such as "upper," "lower," "above," "below," "under," "between," "over," "vertical," "horizontal," "proximal," "distal," and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Terms such as "over," "overlying," "above," "under," etc. are understood to refer to elements that may be in direct contact or may have other elements in-between. For example, two layers may be in overlying contact, wherein one layer is over another layer and the two layers physically contact. In another example, two layers may be separated by one or more layers, wherein a first layer is over a second layer and one or more intermediate layers are between the first and second layers, such that the first and second layers do not physically contact.

Hard disk drives (HDDs) have a wide range of applications in consumer electronics. As the technology of HDDs continues to improve, particularly in their functional and storage capabilities, the need for robust security systems to protect the information contained in HDDs also increases. A number of security systems use an authentication factor, for example a device identifier, a password, or cryptographic key. The strength of the authentication factor can be increased by using unpredictable and un-guessable numbers, such as truly random numbers. However, the generation of truly random numbers can be difficult. Additional hardware can be used to help generate truly random numbers, however that increases the cost of HDDs. Pseudo-random numbers are easier to generate and may be used, however pseudo-random numbers are less effective and less secure than truly random numbers. Embodiments described herein address these concerns using components of microwave-assisted magnetic recording (MAMR) HDDs.

The electromechanical nature of HDDs results in a number of noise generating components, wherein the noise includes random fluctuations. For example, MAMR HDDs include a spin torque oscillator (STO) that functions to generate a field, such as a radio frequency (RF) field to assist in magnetization switching. According to embodiments described herein, the STO generates signals including a noise component that serves as source for generating true random numbers.

Figure 1:
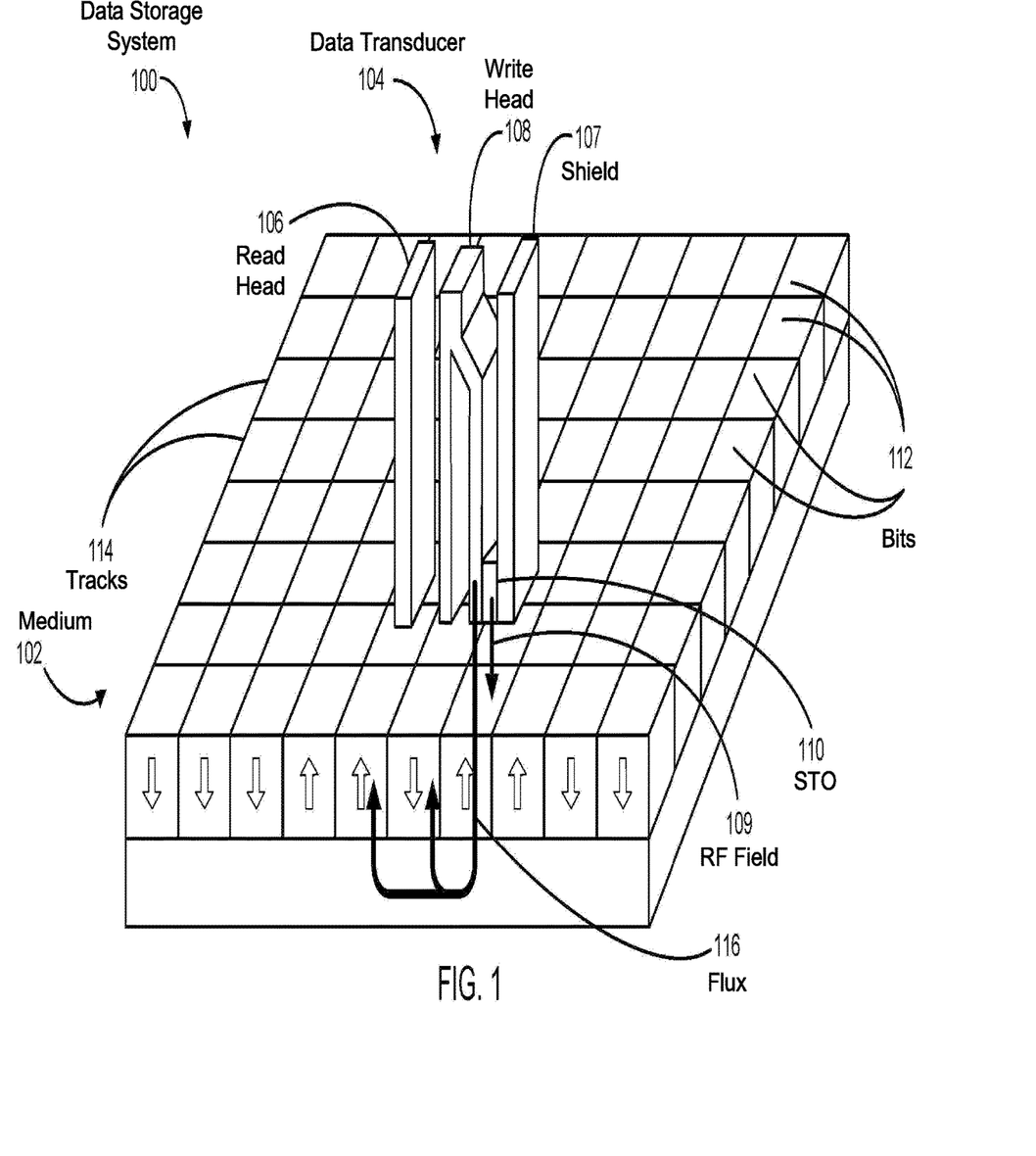
FIG. 1 shows an exemplary data storage system according to one aspect of the present embodiments.

FIG. 1 represents an exemplary data storage system 100 according to one aspect of the present embodiments. According to embodiments described herein, the system 100 is a portion of a MAMR HDD including a rotatable data recording medium 102 and an adjacent data transducer 104. In some embodiments, the recording medium 102 and the data transducer 104 may be MAMR components incorporated into a more complex data storage system, such as a hybrid data storage drive employing a non-volatile solid-state memory.

The data transducer 104 is positioned in close proximity to the surface of the medium 102. The data transducer 104 includes a read head 106 (e.g. a magneto-resistive (MR) sensor) and a write head 108. The read head 106 and the write head 108 read and write data from a host device (not shown) to the recording medium 102. The data is stored in a number of bits 112 arranged in a number of concentric tracks 114 in the medium 102.

During a read operation, the read head 106 detects information stored as magnetization sequences (figuratively depicted as up and down arrows) of the bits 112 along portions of the concentric tracks 114. During a write operation, the write head 108 generates a magnetic field in order to adjust the magnetization sequences of the bits 112 according to the information to be stored in the medium 102. In MAMR HDDs, an STO 110 associated with the write head 108 generates an RF field 109 (e.g. microwave field) in order to assist the magnetic writing to the bits 112. The data transducer 104 may include a shield 107 to focus the RF field 109 generated by the STO 110 on the bits 112 and prevent the RF field 109 from interfering with other components of the data transducer 104. The RF field 109 generated by the STO 110 alters the magnetic properties of one or more of the bits 112 thereby lowering the magnetic coercivity of the bits 112. The alteration of bits 112 in this manner allows a magnetic flux 116 from the write head 108 to more easily change the magnetization of the bits 112 and write a desired magnetization sequence. The STO generates analog signals that include one or more of a direct current (DC) component, a wide bandwidth noise signal, and a higher frequency STO oscillating RF signal. As discussed in further detail below, the wide bandwidth noise signal generated by the STO 110 may be utilized to generate truly random numbers.

According to embodiments described herein, the wide bandwidth noise signal generated by the STO 110 has random fluctuations of intensity (e.g. amplitude) and phase. In various embodiments, the STO 110 may output an electrical signal corresponding to the wide bandwidth noise. The numerical values converted by an ADC from the wide band noise, which are used in further processing (described below) to generate random numbers.

Figure 2:
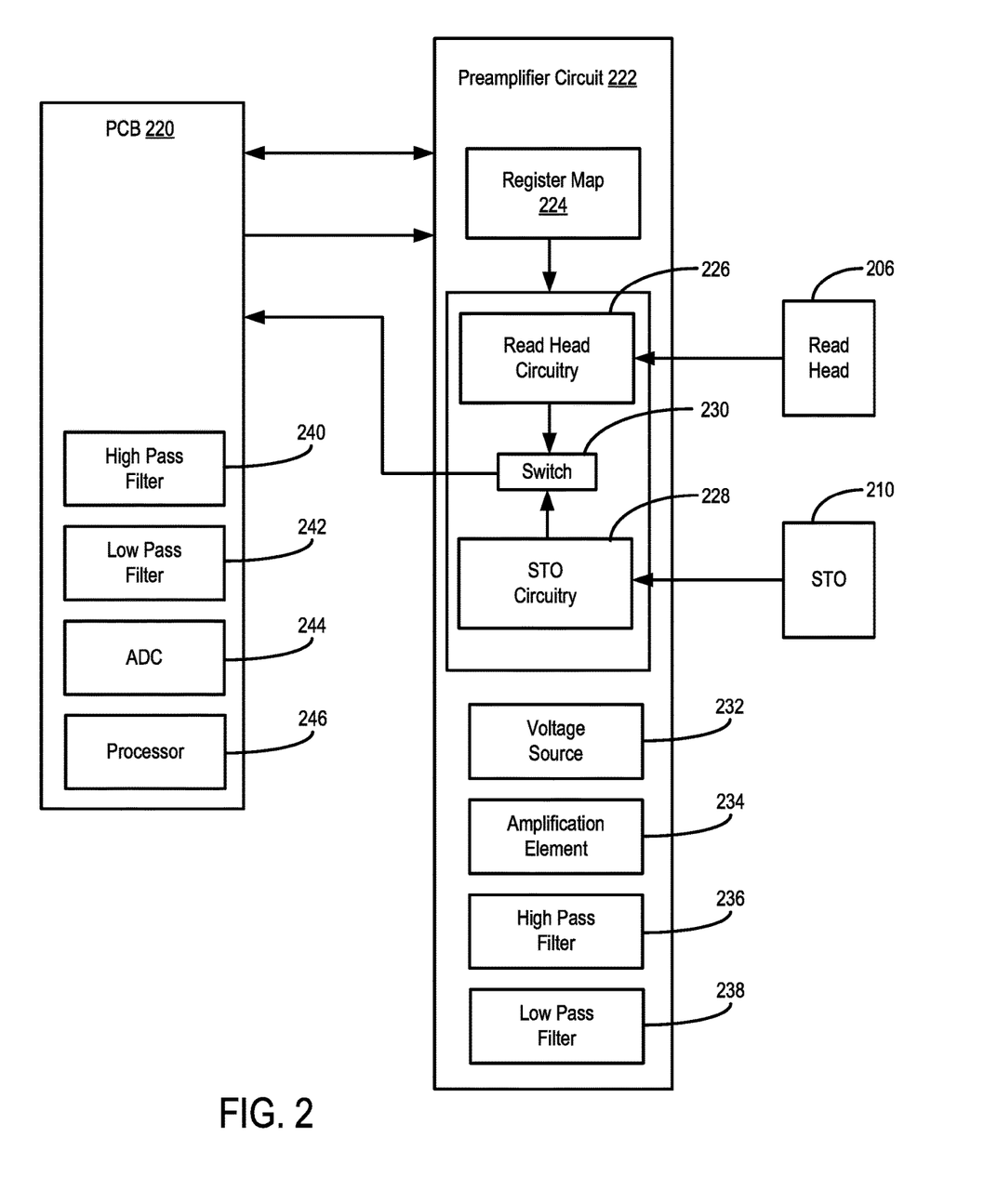
FIG. 2 shows an exemplary STO reader circuit according to one aspect of the present embodiments.

Referring now to FIG. 2, a data transducer control circuit 200 is shown according to one aspect of the present embodiments. In order to detect and use the wide bandwidth noise to generate random numbers (as previously discussed), embodiments described herein couple existing control circuitry to the STO. In various embodiments, a switch is used to selectively couple components to the read head or to the STO, depending on whether data is to be read or random numbers are to be generated.

For example, the data transducer control circuit 200 may include a printed circuit board (PCB) 220 and a preamplifier circuit 222. The preamplifier circuit 222 may include a register map 224, read head circuitry 226 coupled to a read head 206, an STO 210 coupled to STO circuitry 228, and a switch 230. During regular read operations, components of the PCB 220 (e.g. processor(s) 221, channel(s), controller(s), etc.) control the preamplifier circuit 222 for read operations of the read head 206. A register map 224 routes control signals received from the PCB 220 to the appropriate component of the preamplifier circuit 222.

On the other hand, in order to generate one or more random numbers, the PCB 220 transmits a control signal to the switch 230 in the preamplifier circuit 222. In response, the switch 230 decouples the PCB 220 from the read head circuitry 226 and the read head 206, and couples the PCB 220 to the STO circuitry 228 and the STO 210. As such, existing components in the PCB 220 may now be used to detect the wide bandwidth noise signal from the STO 210. In this way, existing hardware in the MAMR HDD (e.g. the PCB 220 and other components not shown) may be utilized for random number generation thereby reducing the need for additional hardware. As drive operations continue, the switch 230 toggles back and forth in response to read operations or random number generation operations.

In some embodiments, the preamplifier circuit 222 may include a voltage source 232 configured to generate a source voltage. The preamplifier circuit 222 may also include one or more amplification elements 234, a high pass filter 236, and/or a low pass filter 238, all of which may operate, for example, to obtain an electrical signal from the STO. The PCB 220 may transmit bias control signals to the preamplifier circuit 222 that vary the settings of the voltage source, the one or more amplification elements, the high pass filter, and the low pass filter, so as to filter out the DC component, and the STO oscillating RF component (if present), thereby leaving the wide bandwidth noise signal.

As previously discussed, the wide bandwidth noise is communicated along the pathway established by the switch 230 for further processing and generation of random numbers by components on the PCB 220. In some embodiments, the signal may be a voltage signal. The signal includes a wide bandwidth noise component and one or both of a DC component and/or a higher frequency STO oscillating RF signal. High pass (HP) and/or low pass (LP) filtering is then used, via a high pass filter 240 and/or a low pass filter 242, to remove the DC component and/or the higher frequency STO oscillating RF signal, thereby leaving the wide bandwidth noise component. The wide bandwidth noise signal may be processed through an analog to digital converter (ADC) 244 which may generate a digital signal. The ADC may sample the signal at a rate based on a sampling control signal received from the PCB components. In some embodiments, the PCB components may set the sampling rate based on an amount of random numbers that need to be generated. The digital value converted by the ADC from the wide bandwidth noise may then be used to generate random numbers as discussed in further detail below.

In some embodiments, random numbers may be generated after write operations, wherein an STO remnant magnetic field is created during the write operations. The bias is selected to remove the STO remnant magnetic field which contains mainly low frequency signals, which can degrade the randomness of random number generation. As such, removing the remnant magnetic field results in signals collected from the STO that contain the intrinsic noise of the STO.

In further embodiments, the random numbers may be generated during passive (e.g. non read/write) operations, wherein the PCB (e.g. processor) puts the STO is in a passive condition either on a load/unload ramp or over the media. It is understood that in such a passive condition, the STO may still generate signals including noise, even though read/write operations are not occurring. If the STO is positioned on the load/unload ramp, the bias is selected (e.g. tuned) to a value that cancels the STO remnant magnetic field. If the STO is on the media, the bias is similarly tuned to cancel the STO remnant magnetic field. In this case, the signal for the random number generation includes the intrinsic STO noise and the signal pick-up from the media by the STO. This turns off the servo control and transducer protrusion, which causes the actuator/slider to float on the disc in a passive head fly condition, thereby resulting in the media signals picked up by the STO to be purely random.

It is understood that the previously described examples are merely exemplary, and other circuitry and configurations may be used to collect the noise from the STO. For example, in other embodiments, a switch may not be used. In such embodiments, a second PCB (not shown) may be connected to the STO in order to use the STO for detection of signals and noise for random number generation. As such, the PCB 220 would continue to operate read processes, and the second PCB would operate STO signal and noise detection. Therefore, configurations utilizing noise generated in the STO to generate random numbers are all understood to fall within the scope of the embodiments described herein.

Figure 3A:
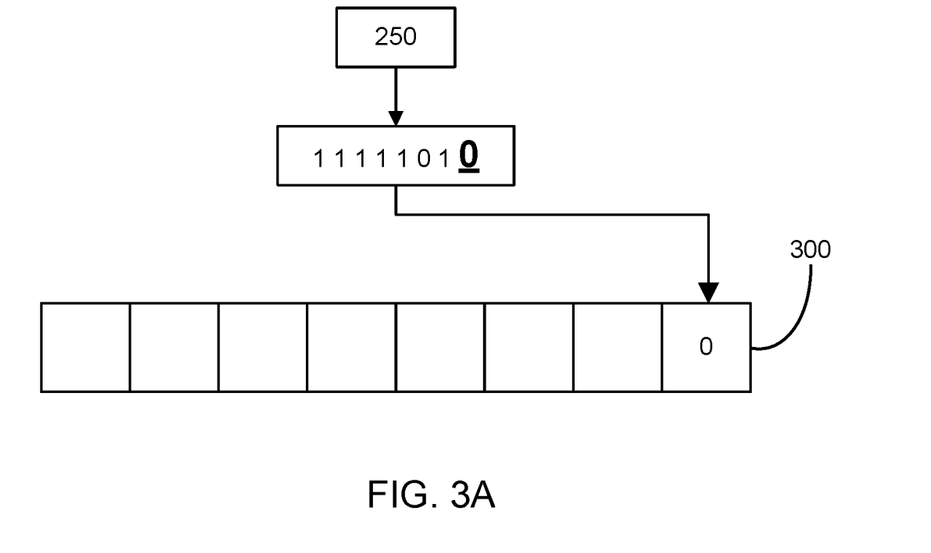
FIGS. 3A, 3B, and 3C show an exemplary bit selection process according to one aspect of the present embodiments.
Figure 3B:
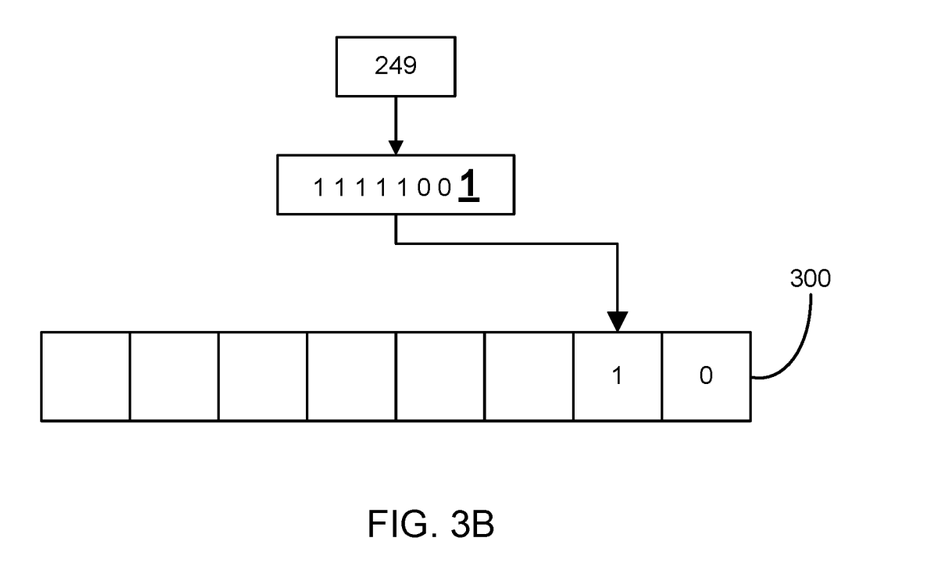
Figure 3C:
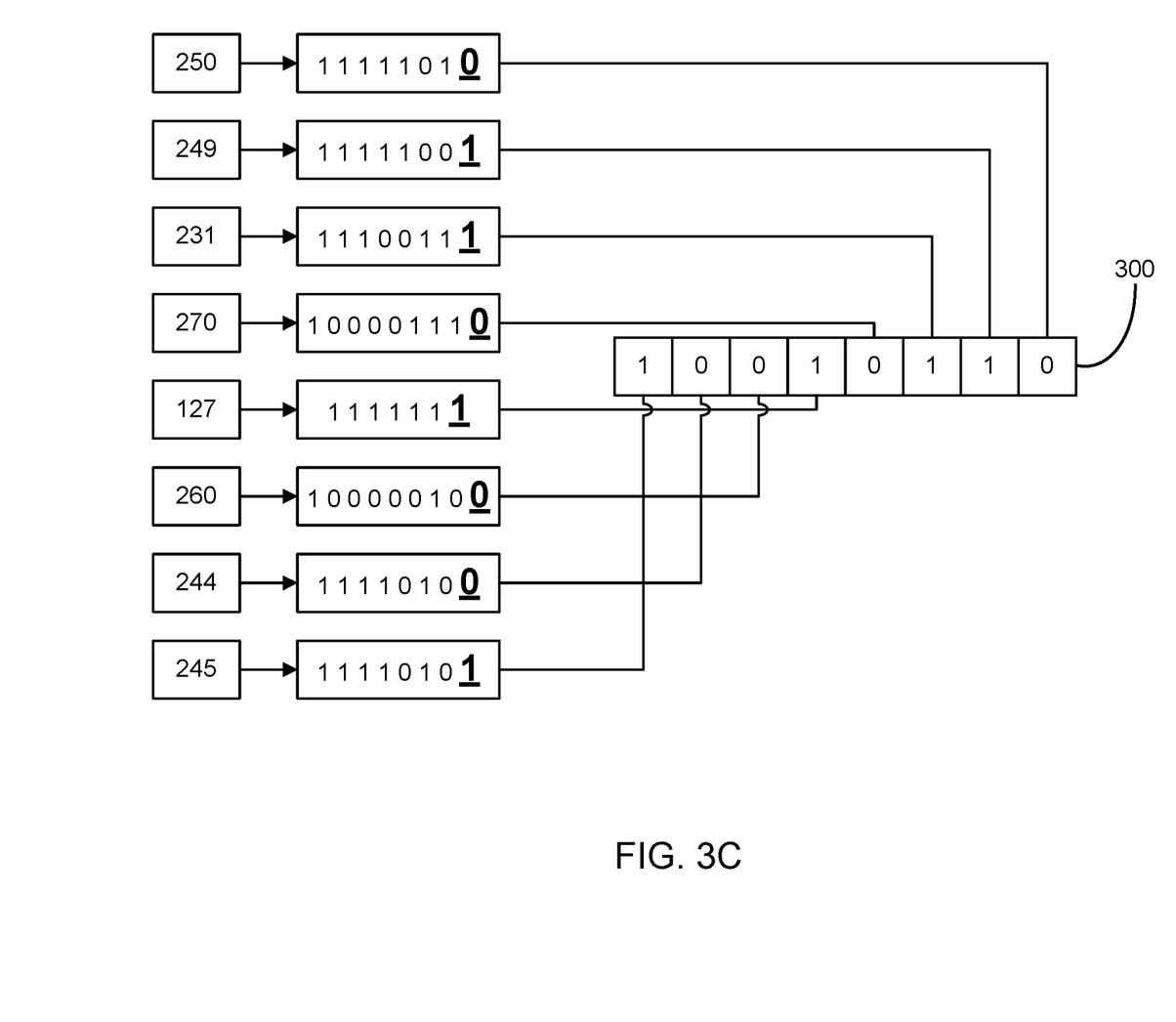

FIGS. 3A, 3B and 3C show an example bit selection process according to one aspect of the present embodiments. As discussed above, the wide bandwidth noise is used by PCB components (e.g. one or more processors such as 246 in FIG. 2) to generate random numbers. Each ADC sample may be used along with other ADC samples to form one or more random numbers. In the following example discussed with reference to FIGS. 3A-3C, the value of each signal is converted to binary, and one or more bits from each are combined to create random numbers.

In FIG. 3A, the PCB components receive a sample of the STO signal including noise and having a value of "250" volts. It should be noted that "250" volts is for ease of illustration only, and the value may be any appropriate voltage. The PCB components convert "250" into binary resulting in "11111010." The PCB components select the least significant bit, corresponding to the right most digit, which in this example is "0." The selected least significant bit "0" is set a first digit of an eight bit number 300. In FIG. 3B, the PCB components receive the next sample, having a value of "249" volts (again, for illustrative purposes only). The PCB components convert "249" to binary, resulting in "11111001." The PCB components select the least significant bit, corresponding to the right most digit, which in this example is "1." The selected least significant bit "1" is set a second digit of the eight bit number 300. The PCB components continue to set the digits of the eight bit number 300 in this manner until a full eight bit number is generated. FIG. 3C shows the completed eight bit number 300. The PCB components may continue generating random numbers in this manner as requested.

It is understood that selecting the least significant digit (e.g. least significant bit) increases the randomness of the random number, because the noise will create larger variations in the least significant bit (as opposed to the most significant bit that will remain more consistent). However, further embodiments may include digits that are different from the least significant digit. As such, in various embodiments bits from different bit orders are selected to form random numbers. For example, a first selected bit is selected from a first numerical value, and a second selected bit is selected from a second numerical value in a different bit order than the first selected bit. As a result, the random number is a combination of bits from different bit orders of different STO readings. In various embodiments, some or none of the selected bits may be least significant bits.

Also, various embodiments may concatenate the selected bits in an order that is independent of the detection of the STO related noise and/or the generation of the digits from the numerical values. As such, selected bits may be in a sequence that is independent of the detecting and generating. In the previously discussed embodiments the random numbers are one or more binary numbers. However, further embodiments may generate one or more random numbers according to other random number systems (e.g. decimal, binary, octal, hexadecimal, etc.).

Figure 4:
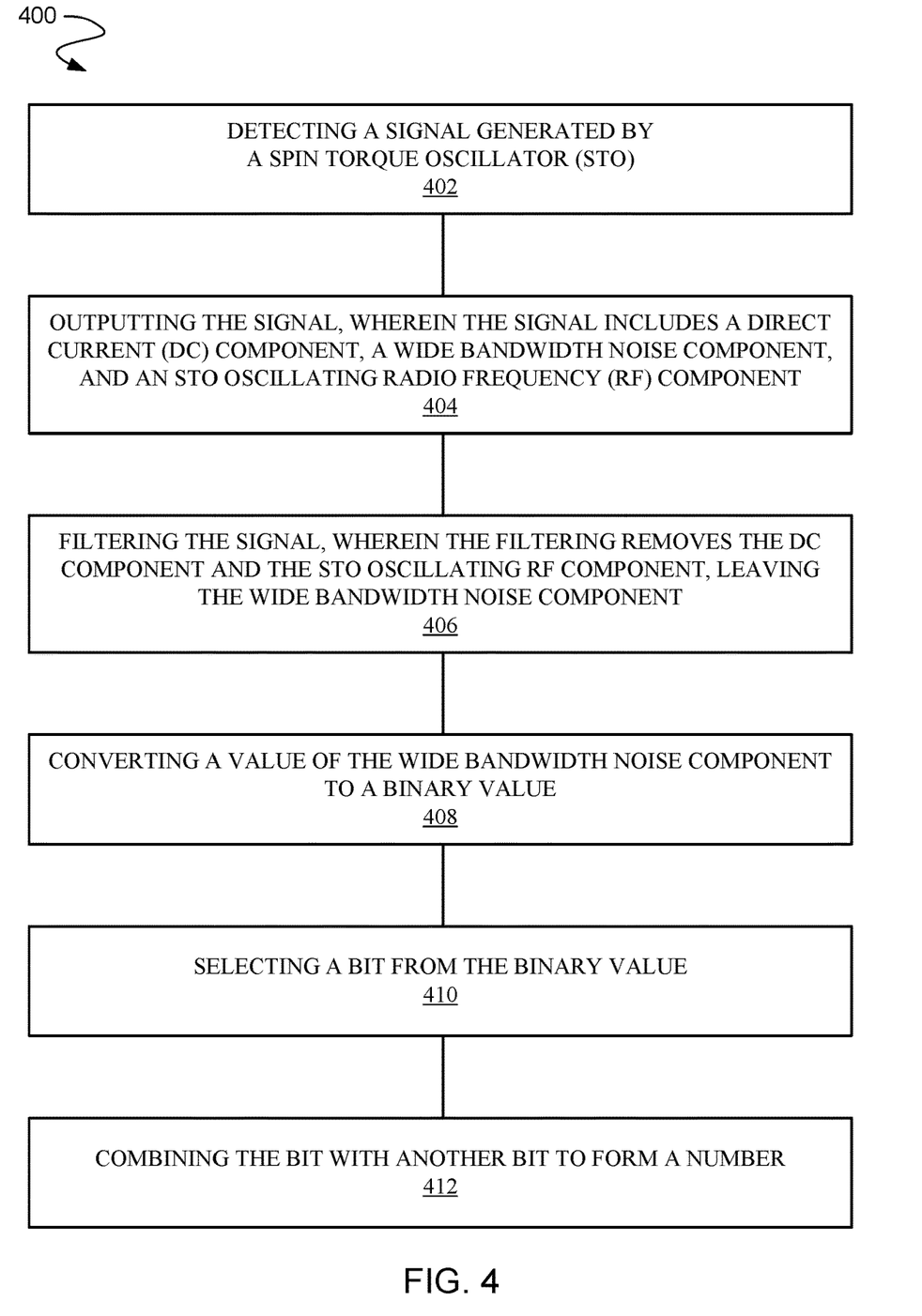
FIG. 4 shows an exemplary flow diagram for generating random numbers according to one aspect of the present embodiments.

FIG. 4 shows an exemplary flow diagram for generating numbers according to one aspect of the present embodiments. At block 402, a signal generated by a spin torque oscillator (STO) is detected. At block 404, the signal is outputted, wherein the signal includes a direct current (DC) component, a wide bandwidth noise component, and an STO oscillating radio frequency (RF) component. At block 406, the signal is filtered, wherein the filtering removes the DC component and the STO oscillating RF component, leaving the wide bandwidth noise component. At block 408, a value of the wide bandwidth noise component is converted to a binary value. At block 410, a bit from the binary value is selected. At block 412, the selected bit is combined with another bit to form a number.

Figure 5:
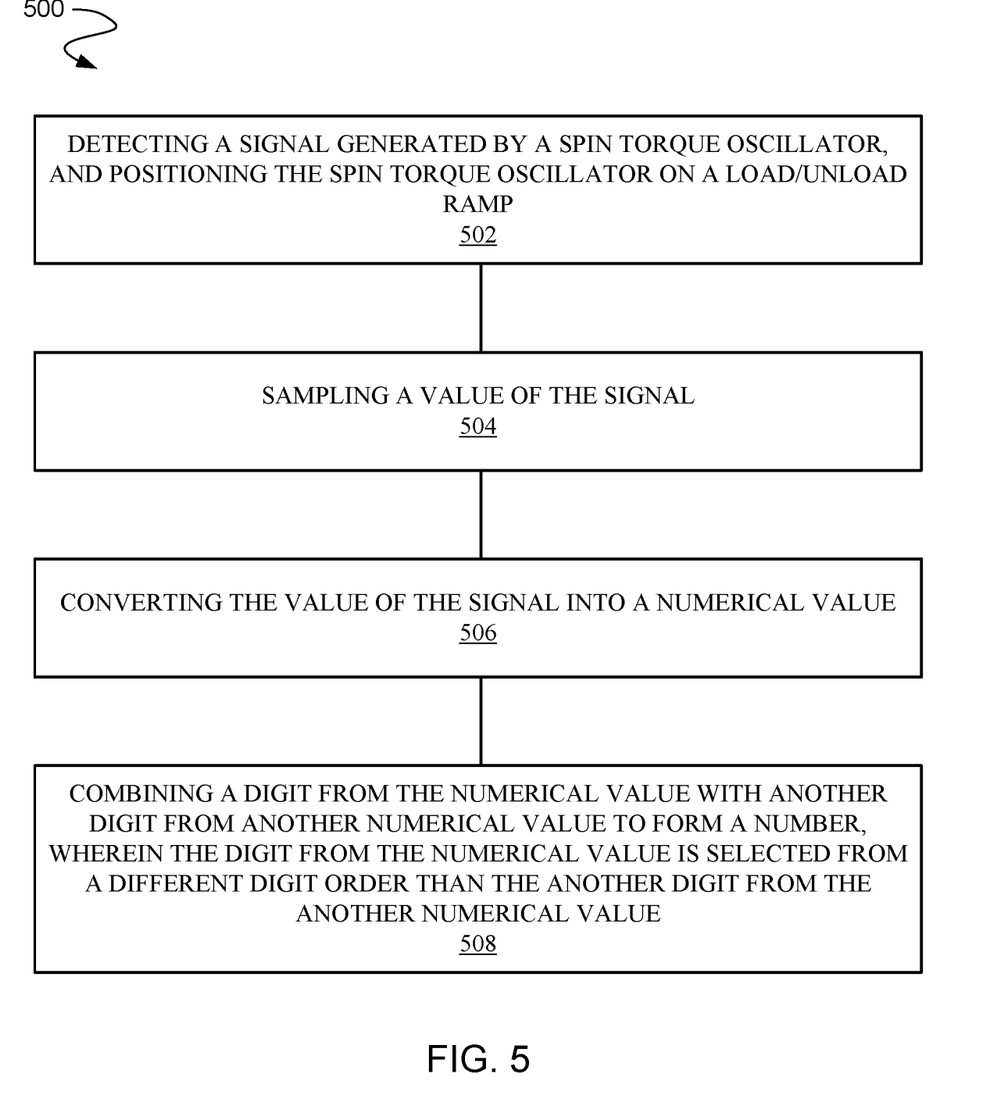
FIG. 5 shows an exemplary flow diagram for generating random numbers according to one aspect of the present embodiments.

FIG. 5 shows an exemplary flow diagram for generating numbers according to one aspect of the present embodiments. At block 502, a signal generated by a spin torque oscillator (STO) is detected. At block 504, a value of the signal is sampled. At block 506, the value of the signal is converted into a numerical value. At block 508, a digit from the numerical value is combined with another digit from another numerical value to form a number.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method comprising:
   detecting a signal generated by a spin torque oscillator (STO) operated to output a radio frequency (RF) field at a selected STO frequency;
   outputting the signal, wherein the signal includes a direct current (DC) component, a wide bandwidth noise component, and an STL oscillating radio frequency (RF) component responsive to the selected STO frequency;
   filtering the signal, wherein the filtering removes the DC component and the STO oscillating RF component, leaving the wide bandwidth noise component;
   converting a value of the wide bandwidth noise component to a binary value;
   selecting a bit from the binary value; and
   combining the bit with another bit to form a number.

2. The method of claim 1, wherein selecting the bit comprises selecting a least significant bit from the binary value.

3. The method of claim 1, wherein the another bit is from another wide bandwidth noise component corresponding to another detected signal.

4. The method of claim 3, wherein the another bit is a result of another detecting and the combining is independent of the order of the detecting and the another detecting.

5. The method of claim 1, wherein the number is one byte.

6. The method of claim 1, wherein the filtering includes tuning a bias to leave the wide bandwidth noise component.

7. The method of claim 1, wherein the another bit is selected from a different bit order than the bit.

8. The method of claim 1, wherein the STO is incorporated into a data transducer adjacent a rotatable magnetic recording medium, the data transducer comprising a data sensor, and wherein the method further comprises operating the STO in a first mode to apply the RF field to the medium during a data read operation using the data sensor to recover data from the medium, and operating the STO in a second mode to generate a random number.

9. The method of claim 8, further comprising using a switch circuit coupled to the STO and the data sensor to switch between the first and second modes.

10. A method comprising:
  detecting a signal generated by a spin torque oscillator (STO);
  sampling a value of the signal;
  converting the value of the signal into a numerical value; and
  combining a digit from the numerical value with another digit from another numerical value to form a number, wherein the digit from the numerical value is selected from a different digit order than the another digit from the another numerical value.

11. The method of claim 10, wherein the digit from the numerical value is a least significant bit of the numerical value.

12. The method of claim 10, wherein the digit from the numerical value is a least significant bit of the numerical value.

13. The method of claim 10, wherein the number is one byte.

14. The method of claim 10, further comprising positioning the STO on a load/unload ramp.

15. An apparatus comprising:
  a spin torque oscillator (STO) configured to:
    generate a plurality of signals including a plurality of noise components;
    output the plurality of signals, wherein the plurality of signals include the plurality of noise components;
  a processor configured to select bits from each of the plurality of noise components to form one or more numbers;
  a magnetoresistance (MR) reader configured to detect a media field; and
  a switch, configured to selectively couple the MR reader or the STO to the processor.

16. The apparatus of claim 15, further comprising a preamplifier circuit coupled to the STO, the preamplifier circuit comprising a high pass filter and a low pass filter which respectively remove direct current components and STO oscillating radio frequency components from the plurality of signals.

17. The apparatus of claim 15, wherein the processor is configured to select a least significant bit from each of the plurality of noise components to form one or more numbers.

18. The apparatus of claim 15, wherein the processor is further configured to select at least one of the bits in a different bit order than another one of the bits.

19. The apparatus of claim 15, wherein the processor is further configured to put the STO in a passive condition during the generation of the plurality of signals including the plurality of noise components.

20. The apparatus of claim 15, wherein one of the one or more numbers is a one byte number.

* * * * *